(12) United States Patent
Li

(10) Patent No.: US 9,911,148 B2
(45) Date of Patent: *Mar. 6, 2018

(54) QUERYING FOR BUSINESS SERVICE PROCESSING STATUS INFORMATION

(71) Applicant: Alibaba Group Holding Limited, George Town (KY)

(72) Inventor: Min Li, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/380,713

(22) Filed: Dec. 15, 2016

(65) Prior Publication Data

US 2017/0161812 A1    Jun. 8, 2017

Related U.S. Application Data

(63) Continuation of application No. 13/925,687, filed on Jun. 24, 2013, now Pat. No. 9,558,513.

(30) Foreign Application Priority Data

Jun. 26, 2012   (CN) .......................... 2012 1 0215897

(51) Int. Cl.
*G06F 9/46*       (2006.01)
*G06Q 30/00*    (2012.01)
(Continued)

(52) U.S. Cl.
CPC ... *G06Q 30/0613* (2013.01); *G06F 17/30864* (2013.01)

(58) Field of Classification Search
None
See application file for complete search history.

(56) References Cited

U.S. PATENT DOCUMENTS 6,047,264 A    4/2000  Fisher
6,285,916 B1   9/2001  Kadaba
(Continued)

FOREIGN PATENT DOCUMENTS

CN    101098260    1/2008
CN    101477648    7/2009
(Continued)

OTHER PUBLICATIONS

Anonymous "Meta refresh—Wikipedia, the free encyclopedia" Jun. 13, 2012. Retrieved on Oct. 1, 2015 at https://en.wikipedia.org/w/index.php?title=Meta_refresh&oldid=497455707.

*Primary Examiner* — Tammy Lee
(74) *Attorney, Agent, or Firm* — Van Pelt, Yi & James LLP

(57) ABSTRACT

Querying for business service processing status information is disclosed, including: receiving a query reference message from a server, wherein the query reference message includes information associated with a set of processing nodes associated with a business service, a sequence associated with the set of processing nodes, and a set of predicted measures of time corresponding to the set of processing nodes; determining a next information query time associated with a current processing node of the set of processing nodes based at least in part on a predicted measure of time of the set of predicted measures of time corresponding to the current processing node; in response to occurrence of the next information query time, sending an information query request to the server; and receiving an information query response from the server, wherein the information query response includes a current business service processing status information associated with the business service.

15 Claims, 9 Drawing Sheets

(51) Int. Cl.
    *G06Q 30/06*    (2012.01)
    *G06F 17/30*    (2006.01)

(56) References Cited

U.S. PATENT DOCUMENTS

| | | |
|---|---|---|
| 6,980,963 B1 | 12/2005 | Hanzek |
| 7,895,298 B1 | 2/2011 | Murray |
| 7,996,328 B1 | 8/2011 | Lundberg |
| 2004/0078105 A1 | 4/2004 | Moon |
| 2006/0168584 A1 | 7/2006 | Dawson |
| 2006/0282277 A1 | 12/2006 | Ng |
| 2008/0071595 A1 | 3/2008 | Chang |
| 2009/0292682 A1 | 11/2009 | Robbins |

FOREIGN PATENT DOCUMENTS

| | | |
|---|---|---|
| CN | 101577651 | 11/2009 |
| CN | 102170422 | 8/2011 |
| JP | 2003054750 | 2/2003 |
| JP | 2010267104 | 11/2010 |
| JP | 2011100370 A | 5/2011 |
| JP | 2011118594 | 6/2011 |

300

┌─────────────────────────────────────────────────┐
│ Receive a query reference message from a server, wherein
│ the query reference message includes information
│ associated with a set of processing nodes associated with a ─ 302
│ business service, a sequence associated with the set of
│ processing nodes, and a set of predicted measures of time
│ corresponding to the set of processing nodes
└─────────────────────────────────────────────────┘
                          ↓
┌─────────────────────────────────────────────────┐
│ Determine a next information query time associated with a
│ current processing node of the set of processing nodes
│ based at least in part on a predicted measure of time of the ─ 304
│ set of predicted measures of time corresponding to the
│ current processing node
└─────────────────────────────────────────────────┘
                          ↓
┌─────────────────────────────────────────────────┐
│ In response to occurrence of the next information query ─ 306
│ time, send an information query request to the server
└─────────────────────────────────────────────────┘
                          ↓
┌─────────────────────────────────────────────────┐
│ Receive an information query response from the server,
│ wherein the information query response includes a current ─ 308
│ business service processing status information associated
│ with the business service
└─────────────────────────────────────────────────┘

FIG. 3

QUERYING FOR BUSINESS SERVICE PROCESSING STATUS INFORMATION

CROSS REFERENCE TO OTHER APPLICATIONS

This application is a continuation of co-pending U.S. patent application Ser. No. 13/925,687 entitled QUERYING FOR BUSINESS SERVICE PROCESSING STATUS INFORMATION filed Jun. 24, 2013, which claims priority to People's Republic of China Patent Application No. 201210215897.0 entitled A BUSINESS SERVICE PROCESSING STATUS INFORMATION QUERY METHOD AND DEVICE, filed Jun. 26, 2012 both of which are incorporated herein by reference for all purposes.

FIELD OF THE INVENTION

The present application relates to the field of communications technology. In particular, it relates to techniques for querying and sending business service processing status information.

BACKGROUND OF THE INVENTION

After a user sends a business service processing request to a business service server (e.g., a network-side application server in a communications network or a website server on the Internet), the user usually wishes to periodically learn the current processing status of the business service (i.e., the processing status information of this business service) as the business service server is processing the business service processing request. For example, the user would like to know the current stage or progress of the processing of the business service.

Conventionally, a user may learn of the business service processing status information of business services at which he or she had requested a business service processing by using a user terminal with a client-end application executing at the user terminal to exchange information with the business service server. FIG. 1 is an example of such a process.

At 101, the client confirms the business service identifier for a business service whose business service processing status information is requested by a user. For example, each business service is associated with a business service identifier.

At 102, the client determines that the next information query time is the time after a set query interval time length from the time associated with either a previous query for business service processing status information or a start time associated with processing a request associated with the business service identifier. The next information query time is the time at or after which the client will query the business service server to obtain the business service processing status information. Typically, the set query interval time length is a static time period that is configured by a system administrator. The client may send the query with the business service identifier to receive the business service processing status information associated with the business service identifier. The business service processing status information indicates the progress of the processing.

At 103, the client determines whether the current time matches or is past the next information query time. In the event that the current time matches or is past the next information query time, control is transferred to 104. Otherwise, control is transferred to 103.

At 104, the client sends an information query request to the business service server. The information query request includes the business service identifier associated with the business service whose status is requested.

At 105, after receiving the information query request, the business service server extracts the business service identifier that is included in the request and uses the business service identifier to determine a current business service processing status information of the business service to include in an information query response to the client. The business service server includes the current business service processing status information into an information query response and sends the information query response to the client.

At 106, after receiving the information query response, the client extracts the current business service processing status information included in the information query response and compares the extracted information query response with a stored business service processing status information. The stored business service processing status information was received in response to a previous information query request sent by the client and is stored locally at the client.

At 107, it is determined whether the business service processing status of the business service has changed since the previous information query request based on the comparison between the extracted information query response and the stored business service processing status information. If the extracted information query response and the stored business service processing status information are the same, then it means that the business service processing status of the business service has not changed since the previous information query request and control is transferred to 102. If the extracted information query response and the stored business service processing status information are not the same, then control is transferred to 108.

At 108, it is determined whether processing of the business service associated with the business service identifier has completed based on the extracted business service processing status information. In the event that the business service associated with the business service identifier has completed, then the process ends. Otherwise, control is transferred to 102. The business service processing status information extracted from the information query response indicates the current progress of the business service and whether processing has completed.

In the business service processing status information querying solution described above in process 100, the query time intervals are set to be relatively short time lengths so that the user can promptly learn the most recent business service processing status information after the business service processing status information has changed. Thus, it is by frequently querying the server for business service processing status information that changes in the processing status of a business service are detected and presented to the user.

However, changes to business service processing status information during the process of processing a business service may not be at all frequent. Therefore, in the information querying solution described above, each subsequent business service processing status information that is obtained from the business service server is often the same as the last query result. As a result, in the solution described above, the client expends many resources querying the business service server unnecessarily.

BRIEF DESCRIPTION OF THE DRAWINGS

Various embodiments of the invention are disclosed in the following detailed description and the accompanying drawings.

FIG. 3 is a flow diagram showing an embodiment of a process for querying for business service processing status information.

DETAILED DESCRIPTION

Figure 1:
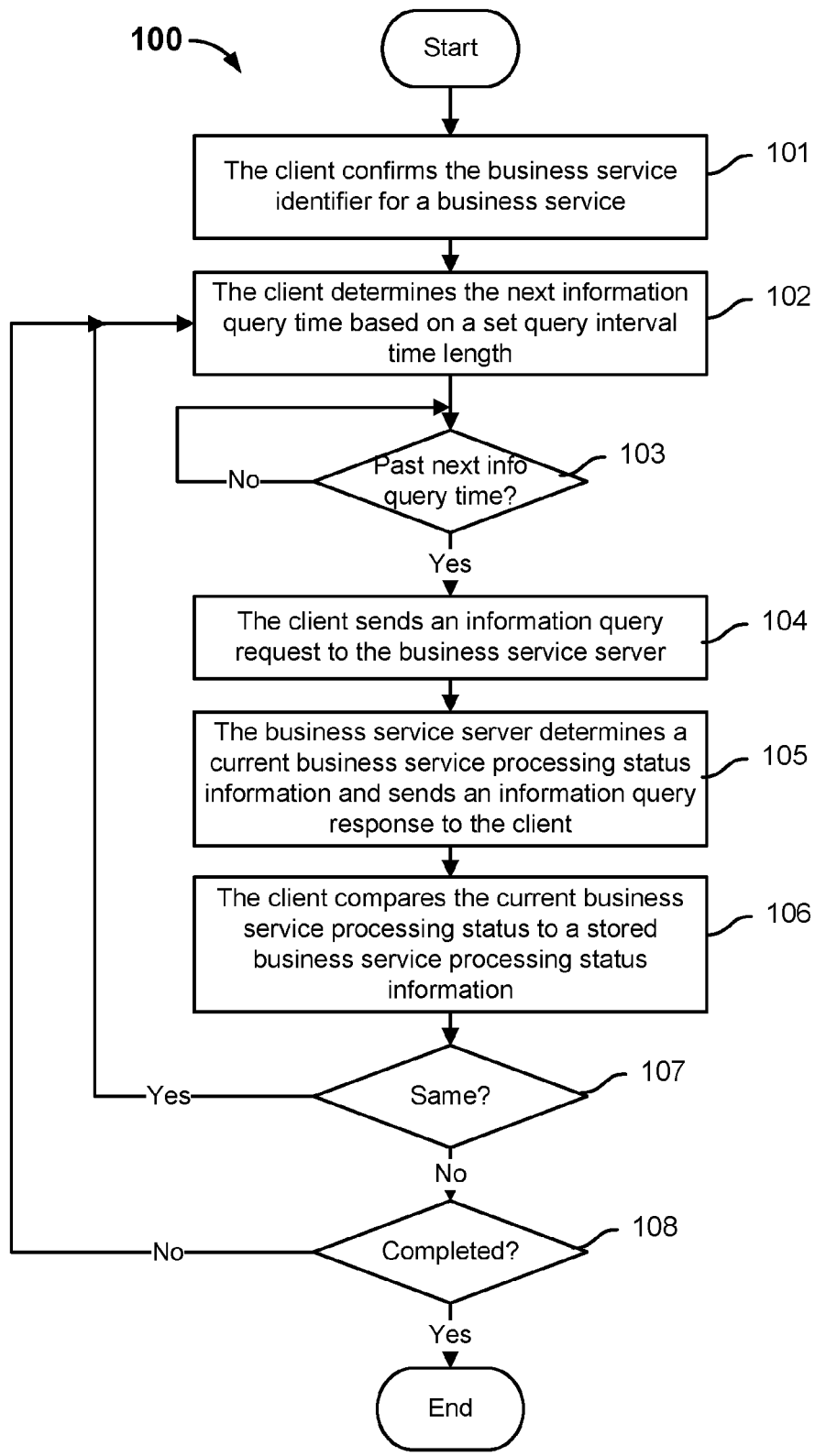
FIG. 1 is a flow diagram showing an example of querying for business service processing status information.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of querying for business service processing status information are described herein. In various embodiments, a business service can be a virtual service or a physical service (e.g., the delivery of cargo). In various embodiments, the business service processing status information refers to the progress of processing the business service. For example, the business service processing status information may indicate that the business service processing is complete or at some degree of progress that is short of completion.

A client sends a business service processing request to a server. The business service processing request is associated with an identifier associated with the requested business service. In some embodiments, the server sends a query reference message to the client, where the query reference message includes at least information associated with a set of processing nodes associated with the business service, a sequence associated with the set of processing nodes that specifies the order in which the set of processing nodes perform their respective portions of the business service, and a predicted measure of time corresponding to each processing node of the set of processing nodes. In various embodiments, a processing node refers to a portion of a business service so a business service may comprise a series of one or more processing nodes that are individually completed. For example, a predicted measure of time corresponding to a processing node refers to the predicted amount/duration/period of time that the processing node will be completed. The client may send an information query request to the service to receive the current business service processing status information associated with the business service. For example, the current business service processing status information may indicate the latest processing node of the business service that has been completed and/or that the processing of the entire business service has completed. Based on the information included in the query reference message, the client may send an information query request to the server after each time by which a processing node of the business service is predicted to be completed such that there is a higher likelihood that the current business service processing status information returned by the server will indicate a change in processing status of the business service from the previous information query request sent by the client. As such, querying of the server by the client may be minimized, thereby saving resources that would have otherwise been expended on sending and responding to information query requests.

Figure 2:
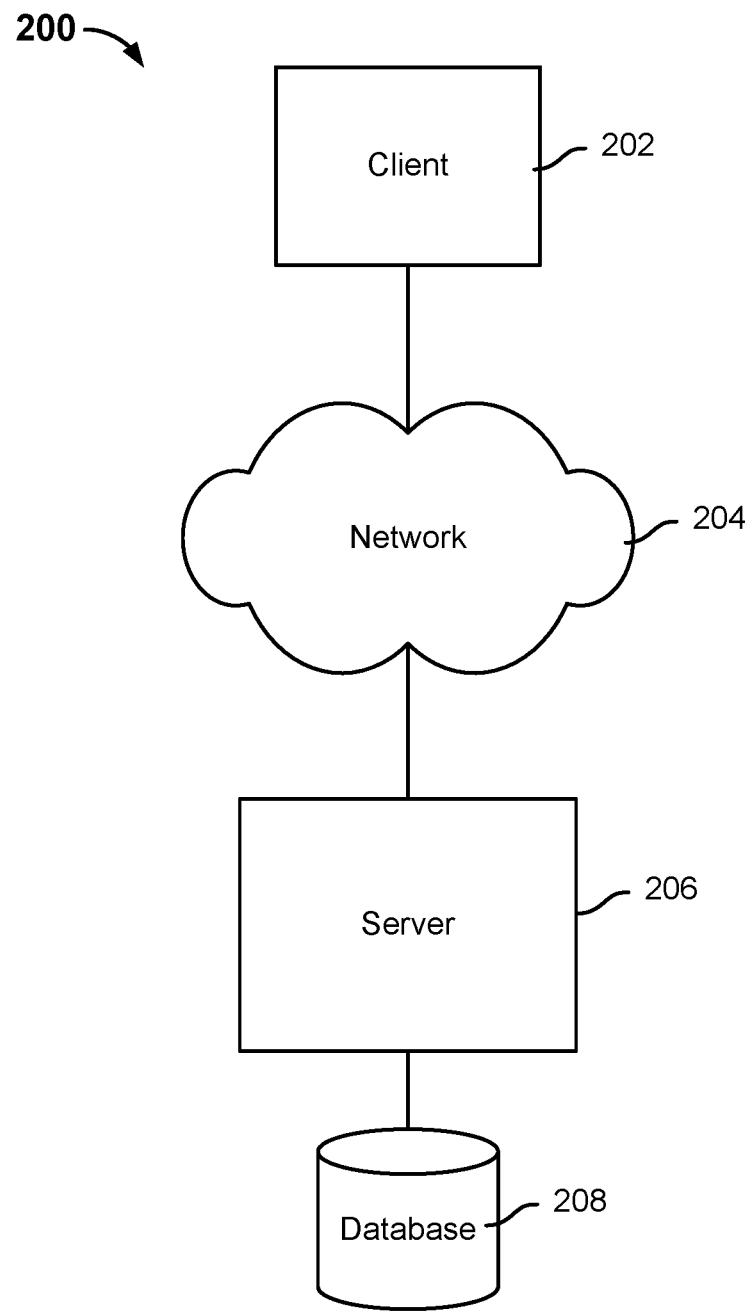
FIG. 2 is a diagram showing an embodiment of a system for querying for business service processing status information.

FIG. 2 is a diagram showing an embodiment of a system for querying for business service processing status information. In the example, system 200 includes client 202, network 204, server 206, and database 208. Network 204 includes high-speed data networks and/or telecommunication networks.

Client 202 is configured to communicate with server 206 over network 204. While client 202 is shown to be a smart phone, other examples of client 202 are a laptop computer, a desktop computer, a mobile device, a tablet device, and/or any other computing device. Client 202 includes an input interface (e.g., a physical keyboard or touchscreen) through which a user may input characters and also a display interface at which information may be displayed for the user. In various embodiments, client 202 is configured to communicate with server 206 to request server 206 to process a particular business service. In various embodiments, the request sent by client 202 to process the business service includes a business service identifier associated with the business service to be processed.

In various embodiments, server 206 is configured to determine a set of processing nodes corresponding to the requested business service. In various embodiments, a business service comprises a series of processing nodes, where one processing node is processed at a time. In some embodiments, server 206 is configured to determine which processing nodes correspond to the requested business service based on mappings stored at database 208 of business services and corresponding sets of processing nodes. In some embodiments, server 206 is configured to determine which processing nodes correspond to the requested business service based on historical data stored at database 208 indicating which processing nodes are commonly associated with each previously performed business service that is similar to the requested business service. In some embodiments, server 206 is configured to determine a sequence associated with the processing nodes associated with the requested business service and also a set of predicted measures of time corresponding to the set of processing nodes associated with the requested business service. In various embodiments, server 206 is configured to determine a predicted measure of time corresponding to each processing node based at least in part on historical data stored at database 208 of actual amounts of time the processing node had taken to complete from previous instances of processing. Server 206 is configured to send a query reference message to client 202, where the query reference message includes information associated with the set of processing nodes associated with the requested business service, the sequence associated with the set of processing nodes, and a set of predicted measures of time corresponding to the set of processing nodes. In some embodiments, server 206 is configured to process zero or more processing nodes associated with a requested business service and/or send communications to other entities to perform at least some of the processing nodes. In various embodiments, server 206 is configured to track the current processing status information associated with the processing of the business service. For example, the current business service processing status information indicates which processing node has been completed (and at which time), which processing node is currently being processed, and whether processing of the entire business service has completed.

Client 202 is configured to use the contents of the query reference message received from server 206 to determine when to query to server 206 regarding the current business service processing status information associated with the requested business service. Client 202 is configured to use the set of predicted measures of time corresponding to the set of processing nodes to determine which processing node of the requested business service is currently being processed and when that processing node has completed, and to therefore send an information query request for the current business service processing status information associated with the requested business service to server 206. By using the information included in the query reference message sent by server 206 to client 202 for the current business service processing status information associated with the requested business service, client 202 will more likely receive current business service processing status information associated with the requested business service from server 206 that indicates that progress has been made with respect to the business service since a previous information query request sent by client 202 (e.g., a new processing node of the business service has completed since the previous information query request sent by client 202). In some embodiments, client 202 is configured to display the current business service processing status information associated with the requested business service for the user so that the user may follow along with the progress of the processing of the requested business service.

FIG. 3 is a flow diagram showing an embodiment of a process for querying for business service processing status information. In some embodiments, process 300 is implemented at client 202 of system 200 of FIG. 2.

At 302, a query reference message is received from a server, wherein the query reference message includes information associated with a set of processing nodes associated with a business service, a sequence associated with the set of processing nodes, and a set of predicted measures of time corresponding to the set of processing nodes. A request to perform a business service has already been sent to the server and the business service processing has started. In some embodiments, the requested business service is identified by a business service identifier (e.g., a string or alphanumeric value). The server sends the query reference message to the client for the client to use to determine when it is appropriate to send an information query request for the current business service processing status information of the business service to the server. In various embodiments, the set of processing nodes represents different portions of the business service that are to be individually processed. The sequence associated with the processing nodes indicates the order in which each of the processing nodes is to be processed in relation to the other processing nodes in the set. The processing of the business service is considered complete after the last processing node of the set of processing nodes has been completed. In various embodiments, the set of predicted measures of time corresponding to the set of processing nodes includes a corresponding predicted amount/duration/period of time that each processing node of the set of processing nodes will take to be completed.

At 304, a next information query time associated with a current processing node of the set of processing nodes is determined based on a predicted measure of time of the set of predicted measures of time corresponding to the current processing node. In various embodiments, the next information query time corresponds to the time by which the current processing node of the business service is predicted to be completed. The current processing node refers to whichever of the set of processing nodes that is currently being processed. In some embodiments, the predicted measure of time corresponding to the current processing node refers to the predicted amount of time in which the current processing node will be completed. As such, if the current processing node is the first processing node in the set that is processed, then the next information query time is determined as the time that is the predicted measure of time corresponding to the current processing node from the start time at which the business service was processed. If the current processing node is not the first processing node in the set that is processed, then the next information query time is determined as the time that is the predicted measure of time corresponding to the current processing node from the completion time of the previous processing node of the set.

In some other embodiments, the predicted measure of time corresponding to the current processing node refers to the predicted time by which the current processing node will be completed. As such, the next information query time is the predicted measure of time corresponding to the current processing node.

At 306, in response to occurrence of the next information query time, an information query request is sent to the server. The client monitors the current time until the client determines that the current time is or is past the next information query time. Once the client determines that the next information query time has occurred, without requiring further user input, the client is configured to automatically send an information query request to the server to determine the current business service processing status information associated with the business service. By using the information included in the query reference message to determine when to send information query requests to the server, the client does not require prompts from the user to determine when to send information query requests to the server. In some embodiments, the information query request includes the business service identifier to identify the specific business service for which processing status information is sought.

At 308, an information query response is received from the server, wherein the information query response includes a current business service processing status information associated with the business service. Based on the current business service processing status information associated with the business service, the client may determine the current progress in the processing of the business service. In some embodiments, the current business service processing status information associated with the business service may indicate one or more of which processing node is currently being processed, which processing node(s) have been completed, and whether processing of the entire business service has completed. In some embodiments, the client determines that the processing of the business service has been updated since a previous information query request (sent by the client for the same business service) by comparing the current business service processing status information associated with the business service with a stored previously received business service processing status information associated with the business service. In some embodiments, the client determines which processing node(s) of the business service has completed based on information included in the current business service processing status information associated with the business service. In the event that the current business service processing status information associated with the business service indicates that the current processing node has not completed, then the client determines a new next information query time. For example, this new next information query time may be based on a predicted measure of time corresponding to a processing node of the set of processing nodes.

In the event that the current business service processing status information associated with the business service indicates that the current processing node has completed, then the client determines whether the current processing node was the last processing node in the sequence of processing nodes to be processed for the business service. If the completed current processing node is the last processing node in the sequence of processing nodes, then it is determined that the business service has been completed. Otherwise, if the completed current processing node was not the last processing node in the sequence of processing nodes, then the subsequent processing node in the series is determined to be the new current processing node and the new next information query time is determined based on the predicted measure of time corresponding to the new current processing node (e.g., the new next information query time is determined to be the time that is the predicted measure of time corresponding to the subsequent processing node following the current time). At any time, a presentation associated with the current progress of the processing of the business service (e.g., which and how many processing nodes have been completed) may be displayed for the user via a user interface at the client. In some embodiments, the client may first prompt the user for whether the user wishes to see the updated business service processing status information prior to presenting the updated business service processing status information to the user via a user interface.

For example, the business service is associated with a logistics business service such as a cargo delivery service. The requested business service can be a specific delivery of a cargo from origin A to destination D. Each of the processing nodes of the delivery corresponds to a leg in the overall delivery route. For example, each processing node can be a delivery between two adjacent stopping points along the delivery route from origin A to destination D. For example, the delivery of cargo from origin A to destination D may include a first processing node associated with delivery from point A to point B, a second processing node associated with delivery from point B to point C, and a third and last processing node associated with delivery from point C to point D. For example, the predicted measure of time that corresponds to each processing node represents the predicted amount of time that the delivery will be completed for the corresponding processing node. For example, the predicted measure of time that corresponds to the first processing node associated with completing delivery from point A to point B may be 2 hours. After the third and last processing node associated with delivery from point C to point D has completed, it is determined that the processing of the business service has completed.

Figure 4:
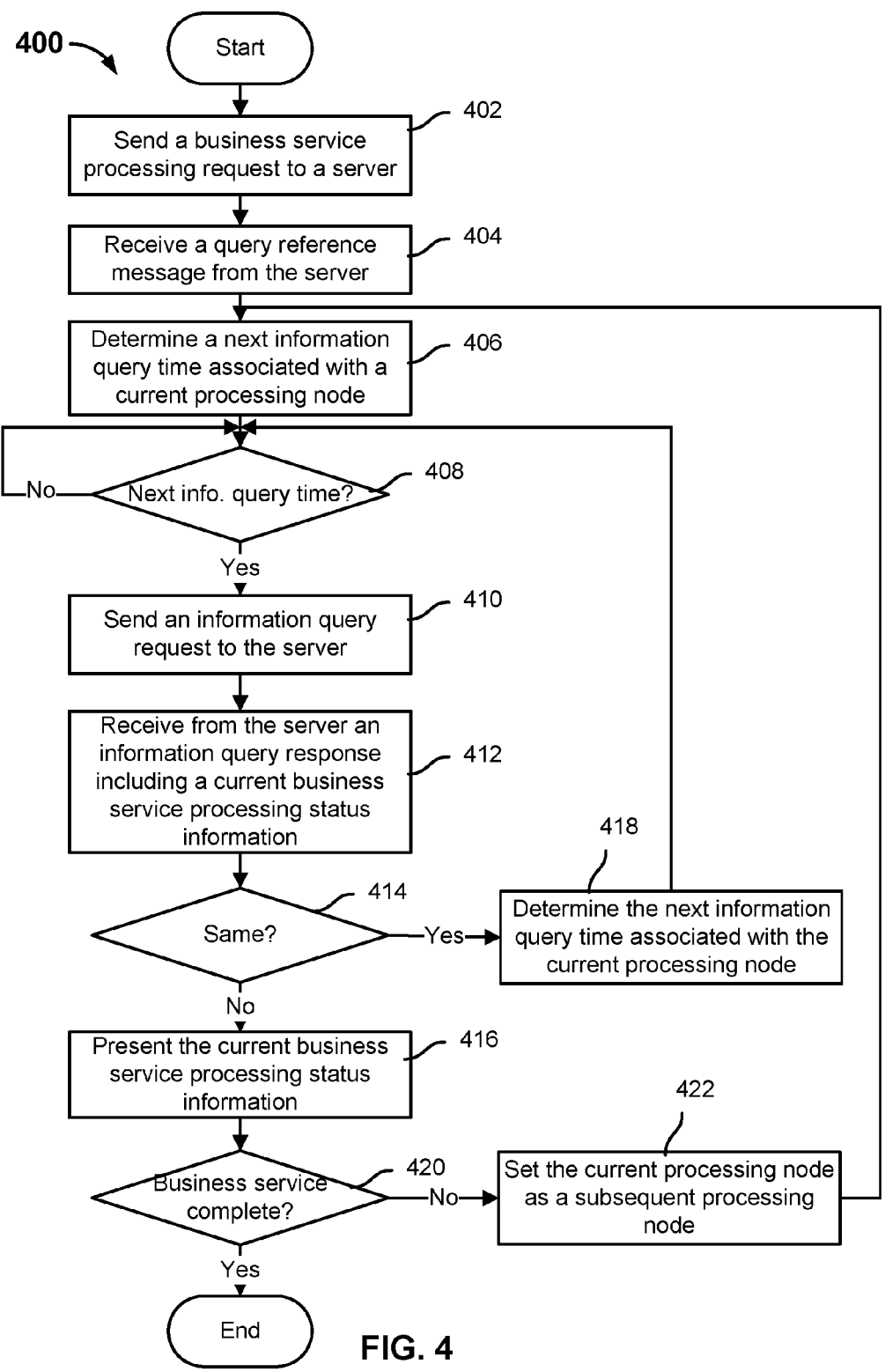
FIG. 4 is a flow diagram showing an embodiment of a process for querying for business service processing status information.

FIG. 4 is a flow diagram showing an embodiment of a process for querying for business service processing status information. In some embodiments, process 400 is implemented at client 202 of system 200 of FIG. 2.

At 402, a business service processing request is sent to a server. The request is sent by the client to the server to request the server to start processing the business service. In some embodiment, the server performs at least a portion of the processing of the business service. In various embodiments, the server tracks the current status information associated with the processing of the requested business service.

At 404, a query reference message is received from the server, wherein the query reference message includes information associated with a set of processing nodes associated with a business service, a sequence associated with the set of processing nodes, and a set of predicted measures of time corresponding to the set of processing nodes. In some embodiments, the query reference message is included in a business service processing response that is returned to the client. As mentioned above, the client is configured to use the contents of the query reference message to determine when it is appropriate to send information query requests to the server to determine the current business service processing status information associated with the business service. In some embodiments, the server determines at least a portion of the contents of the query reference message on a dynamic basis per each business request (e.g., based on the most updated historical data). In some other embodiments, at least a portion of the information associated with the set of processing nodes associated with the business service, the sequence associated with the set of processing nodes, and the set of predicted measures of time corresponding to the set of processing nodes associated with the requested business service are pre-stored at the client and the remaining information is received via the query reference message from the server.

At 406, a next information query time associated with a current processing node of the set of processing nodes is determined. Based on the contents of the query reference message, the client can determine which processing node is currently being processed by the server. For example, after receiving the query reference message, the client may determine that the current processing node is the first processing node to be processed in the sequence of processing nodes associated with the business service. Then as the client periodically queries for current business service processing status information from the server, the client can determine whether a current processing node has completed and that a subsequent processing node has become the new current processing node and is being processed or that the processing of the entire business service has completed (i.e., the last processing node of the sequence has completed).

Assuming for example that the current processing node is the first processing node of the sequence, the next information query time is determined based at least in part on the predicted measure of time corresponding to the first processing node. For example, the next information query time in this case represents the amount of time in which the first processing node is predicted to complete. The next information query time may be determined as the time that is the predicted measure of time corresponding to the first processing node after either the time at which the query reference message was received from the server or the current time at the client. For example, if the predicted measure of time corresponding to the first processing node was 2 hours and the time at which the query reference message was received from the server was 2:00 pm, then the next information query time is determined to be 4:00 pm that same day.

Assuming for example that the current processing node is an $i^{th}$ processing node of the sequence where $i>1$, the next information query time is determined based at least in part on the predicted measure of time corresponding to the $i^{th}$ processing node. The next information query time may be determined as the time that is the predicted measure of time corresponding to the $i^{th}$ processing node after the time at which the previous processing node completed. For example, the time at which a processing node had completed may be included in a business service processing status information that is received from the server.

At 408, it is determined whether the next information query time has occurred. In the event that the next information query time has occurred, control is transferred to 410. Otherwise, control is transferred to 408 and waits until the next information query time has occurred.

At 410, an information query request is sent to the server. In some embodiments, the information query request includes the business service identifier to identify the specific business service for which processing status information is sought.

At 412, an information query response including a current business service processing status information associated with the business service is received. The server obtains the current business service processing status information corresponding to the desired business service based on the business service identifier included in the information query request. The current business service processing status information represents the most current state of the progress of processing the business service. For example, the current business service processing status information may indicate which processing node(s) has been completed and when, which processing node is currently being processed, and whether processing of the entire business service has completed.

At 414, it is determined whether the current business service processing status information is the same as a stored business service processing status information. In the event that the current business service processing status information is the same as a stored business service processing status information, then control is transferred to 418. Otherwise, control is transferred to 416. The stored business service processing status information refers to a previous instance of the current business service processing status information that was received from the server (in response to a previous information query request) and stored by the client. However, if the current processing node is the first processing node, then the stored business service processing status information is pre-stored at the client and includes the value that the first processing node has not been completed. If the current business service processing status information is the same as a stored business service processing status information, then it is determined that the processing status information associated with the business server has not changed (e.g., the current processing node is still being processed). Otherwise, if the current business service processing status information is not the same as a stored business service processing status information, then it is determined that the processing status information associated with the business server has changed (e.g., the current processing node has completed).

At 416, the current business service processing status information is presented. Because it has been determined that the processing status information has changed, then this new processing status information is displayed for the user to show the user the further progress in processing the business service.

At 418, the next information query time associated with the current processing node is determined. Because it has been determined that the status information has not changed, then it is determined that the current processing node has not completed and therefore, the current processing node remains the same. As such, the next information query time is determined to be the time that is the predicted measure of time corresponding to the current processing node after the current time in the sequence of processing nodes. In other words, the next information query time is determined to be the predicted measure of time corresponding to the current processing node after the time at which it was determined that the status information has not changed. After 418, control is transferred to 408.

At 420, it is determined whether processing of the business service has completed based at least in part on the current business service processing status information. If the business service has completed entirely, then the current business service processing status information may state as such, in some embodiments. In the event that it is determined that the business service has completed, then the process ends. Otherwise, control is transferred to 422.

At 422, the current processing node is set as a subsequent processing node of the set of processing nodes. After 422, control is transferred to 406. Because it is determined that the processing of the business service has not completed, then the next processing node is set as the new current processing node and control is transferred to 406. Also, the previous processing node completion time is set to the current time. The previous processing node completion time refers to when the most recent processing node was completed.

Process 400 provides a technique by which the client may determine when to send an information query request to the server to determine the current business service processing status information based on a query reference message sent by the server. The query reference message includes information that includes which processing nodes are associated with the requested business service, which order the processing nodes are to be processed, and how long the processing of each processing node is predicted to take. As such, the client can send an information query request to the server at an appropriate information query time, which is determined based on the predicted amount of time in which the current processing node needs to complete. Therefore, by basing the time at which to query the server on corresponding predicted amounts of time in which the current processing node needs to complete, there is a higher likelihood that each query by the client will return a business service processing status information that is different from the previous instance of the business service processing status information. The client will perform queries to the server in a more intelligent manner because each query will be timed to more likely detect a change in the status information of the processing of the business service, which will be helpful to display to a user using the client.

Figure 5:
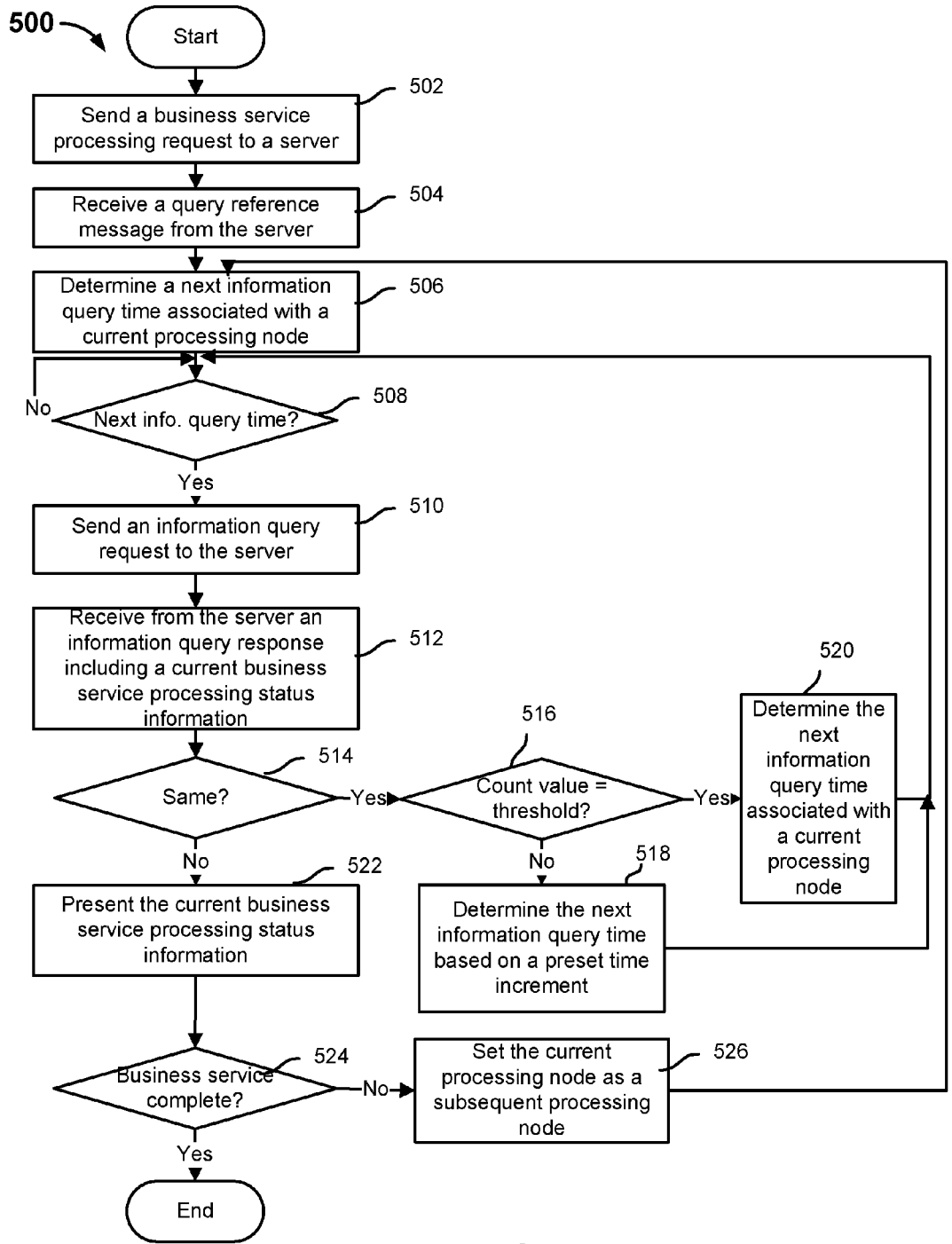
FIG. 5 is a flow diagram showing an embodiment of a process of querying for business service processing status information.

FIG. 5 is a flow diagram showing an embodiment of a process of querying for business service processing status information. In some embodiments, process 500 is implemented at client 202 of system 200 of FIG. 2.

Process 500 is similar to process 400 of FIG. 4 except process 500 additionally uses a preset increment time length and a preset increment count threshold value corresponding to each processing node associated with a requested business service.

At 502, a business service processing request is sent to a server.

At 504, a query reference message is received from the server, wherein the query reference message includes information associated with a set of processing nodes associated with a business service, a sequence associated with the set of processing nodes, a set of predicted measures of time corresponding to the set of processing nodes, a set of preset time increments corresponding to the set of processing nodes, and a set of preset increment count threshold values. In various embodiments, each of the set of preset time increments corresponds to a processing node of the set of processing nodes and, as will be described below, is used to determine a new next information query time for a corresponding current processing node if it is determined that the queried for business service processing status information has not changed after the elapse of the predicted measure of time corresponding to the corresponding current processing node. In various embodiments, each of the set of preset increment count threshold values corresponds to a processing node of the set of processing nodes and, as will be described below, is used to determine whether a delay might have occurred with respect to the processing node corresponding to the preset increment count threshold value. The preset time increment and the preset increment count threshold value corresponding to each processing node may be determined based on the characteristics associated with that processing node and/or historical data associated with that processing node.

In some other embodiments, at least a portion of the information associated with the set of processing nodes associated with the business service, the sequence associated with the set of processing nodes, the set of predicted measures of time corresponding to the set of processing nodes, a set of preset time increments corresponding to the set of processing nodes, and a set of preset increment count threshold values associated with the requested business service are pre-stored at the client and the remaining information is received via the query reference message from the server At 506, a next information query time associated with a current processing node of the set of processing nodes is determined. In various embodiments, 506 is similar to 406 of process 400 of FIG. 4.

At 508, it is determined whether the next information query time has occurred. In the event that the next information query time has occurred, control is transferred to 510.

At 510, an information query request is sent to the server.

At 512, an information query response including a current business service processing status information associated with the business service is received.

At 514, it is determined whether the current business service processing status information is the same as a stored business service processing status information. In the event that the current business service processing status information is the same as a stored business service processing status information, then control is transferred to 516. Otherwise, control is transferred to 522.

At 516, a count value associated with the current processing node is incremented and it is determined whether the count value meets a preset increment count threshold value of the set of preset increment count threshold values corresponding to the current processing node. In the event it is determined that the preset increment count threshold value is not met, then control is transferred to 518. Otherwise, control is transferred to 520. A count value is created for each new current processing node and is initially set to zero. Then, each time that it is determined that the current business service processing status information has not changed since a previous business service processing status information, then the count value is incremented by one.

At 518, the next information query time is determined based at least in part on the preset time increment of the set of preset time increments corresponding to the current processing node. The client will wait an amount of time corresponding to the preset time increment corresponding to the current processing node before sending another information query request to the server. For example, the next information query time is determined as the time that is the amount of time corresponding to the preset time increment corresponding to the current processing node after a current time (e.g., at which the count value associated with the current processing node is determined to not meet the preset increment count threshold value). After 518, control is transferred to 508.

At 520, the next information query time associated with the current processing node is determined. Because it has been determined that the preset increment count threshold value has been met, the next information query time is determined to be the time that is the predicted measure of time corresponding to the processing node immediately after the current time in the sequence of processing nodes. In some embodiments, the preset time increment count corresponding to a processing node is shorter than the predicted measure of time corresponding to that same processing node. Therefore, once the count value of the current processing node is determined to meet the preset increment count threshold value, the next information query time is set to be later than it would be had the count value of the current processing node not met the preset increment count threshold value. After 520, control is transferred to 508.

In the event there is a delay with respect to processing the current processing node, a message is optionally presented to the user to indicate such a delay. This way, the user is kept apprised of slower than predicted processing times of a portion of the requested business service.

At 522, the current business service processing status information is presented. Because it has been determined that the processing status information has changed, then this new processing status information is displayed for the user to show the user the further progress in processing the business service.

At 524, it is determined whether processing of the business service has completed based at least in part on the current business service processing status information. If the business service has completed entirely, then the current business service processing status information would state as such. In the event that it is determined that the business service has completed, then the process ends. Otherwise, control is transferred to 526.

At 526, the current processing node is set as a subsequent processing node of the set of processing nodes. After 526, control is transferred to 506. Because it is determined that the processing of the business service has not completed, then the next processing node is set as the new current processing node and control is transferred to 506. Furthermore, a count value associated with the new current processing node is set to zero and the previous processing node completion time is set to the current time. The previous processing node completion time refers to when the most recent processing node was completed.

For example, process 500 may be applied to a logistics business service. A business service may be, for example, to ship cargo from Location A to Location D and each processing node associated with the business service is a portion of the delivery route from Location A to Location D. Table 1 below includes information associated with the various processing nodes associated with the example delivery of cargo from Location A to Location D:

client sends an information query request for business service 123XY, the returned current business service processing status information will indicate, for example, that the cargo is currently being shipped from Location B to Location C or that the cargo has already arrived at Location B. Both examples of the current business service processing status information indicate that processing node Node 1 has been completed, and that processing node Node 2 is currently being processed.

The information of Table 1 may be used in a process such as process 500 of FIG. 5, for example. As described for process 500, for each current processing node, the client uses the processing node's corresponding predicted measure of time to determine when it is appropriate to send an information query request to the server (without requiring user input to determine when to send an information query request). In the event that the information query response returned from the server indicates that the business service processing status has been updated, then the client may present the update to the user, thereby saving the user the hassle of checking for the update on his or her own initiative. In the event that the query response indicates that the business service processing status has not been updated, then the client uses the corresponding preset time increment and preset increment count threshold value to determine when next to send an information query request and perhaps, to notify the user of a delay in the processing of the requested business service.

Figure 6:
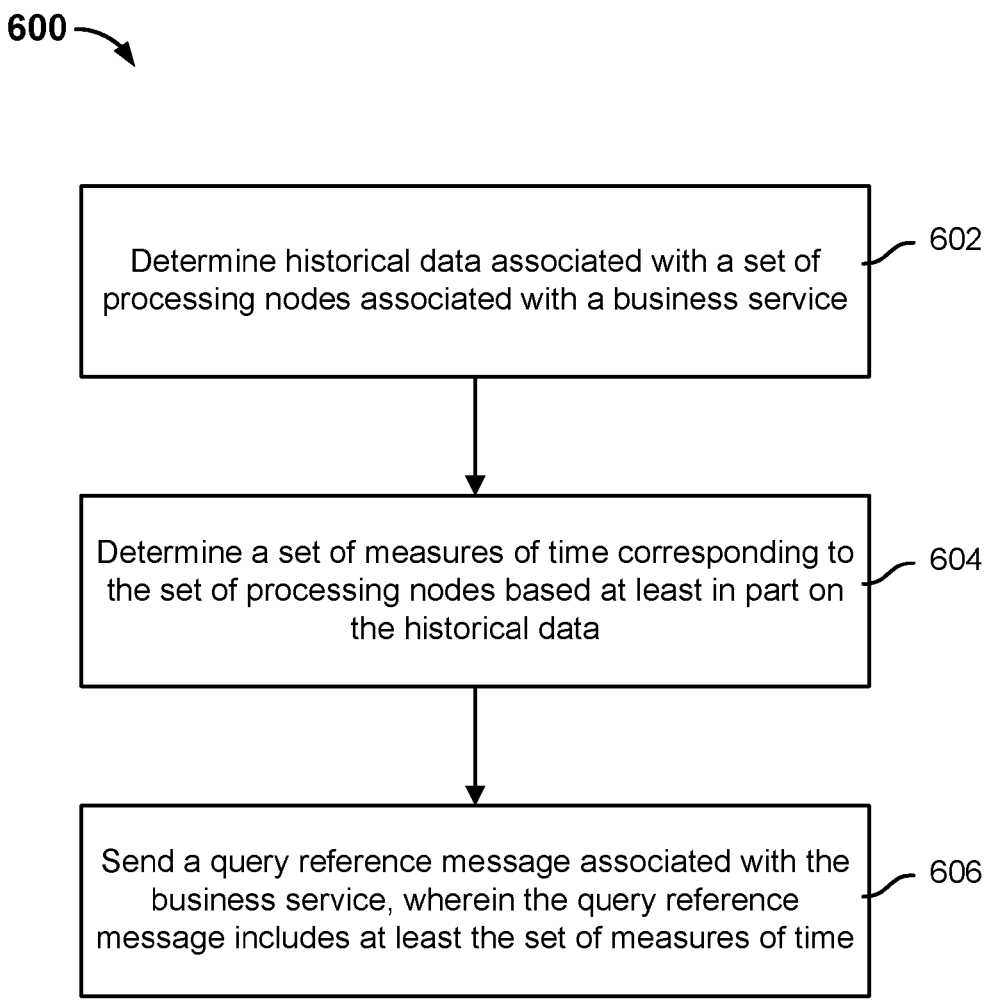
FIG. 6 is a flow diagram showing an embodiment of a process for determining a query reference message.

FIG. 6 is a flow diagram showing an embodiment of a process for determining a query reference message. In some embodiments, process 600 is implemented at server 206 of FIG. 2.

Process 600 shows an example of determining the contents of a query reference message to send to a client that previously requested a business service. For example, the query reference message may be sent in a business query

TABLE 1

| Business service identifier | Processing node | Shipped from | Delivered to | Predicted measure of time (minutes) | Preset time increment (minutes) | Preset increment count threshold value |
|---|---|---|---|---|---|---|
| 123XY | Node 1 | Location A | Location B | 180 | 30 | 4 |
|  | Node 2 | Location B | Location C | 1440 | 60 | 6 |
|  | Node 3 | Location C | Location D | 720 | 60 | 4 |

As shown in Table 1 above, the business service of the delivery of cargo from Location A to Location D comprises processing node Node 1, processing node Node 2, and processing node Node 3. The business service identifier in the example is 123XY. Each processing node corresponds to a portion of the overall delivery route and is associated with the delivery between two adjacent locations within the overall delivery route. Processing node Node 1 corresponds to the delivery of the cargo from Location A to Location B, processing node Node 2 corresponds to the delivery of the cargo from Location B to Location C, and processing node Node 3 corresponds to the delivery of the cargo from Location C to Location D. For example, once the cargo is successfully delivered from Location A to Location B, then processing node Node 1 has been completed. The predicted measure of time (e.g., the predicted amount of time needed to complete a processing node), the preset time increment, and the preset increment count threshold value corresponding to each processing node are noted in Table 1. When the response sent in response to the initial request for the business service. The client may use the contents of the query reference message to determine when it is appropriate to send information query requests to the server to receive the current business service processing status information of the requested business service such that the client may send the information query requests to the server when it is likely that the current business service processing status information has changed from a previous information query request.

At 602, historical data associated with a set of processing nodes associated with a business service is obtained. For example, the particular business may be identified by an identifier. For example, if the business service were related to cargo delivery, the identifier may include an origin location and a destination location. In some embodiments, based on the business service identifier, the server may look up historical actual delivery times (e.g., from a database that stores historical amounts of times used to complete various business services and their associated processing nodes) for previous business services similar to that business service to determine the historical actual predicted measures of time corresponding to the respective processing nodes of the business service. For example, a predicted measure of time corresponding to a processing node associated with shipping cargo from Location B to Location C may be an amount of time that a previous delivery actually took to ship cargo from Location B to Location C. For example, multiple historical amounts of time needed to complete a processing node may be determined for each processing node.

At 604, a set of predicted measures of time corresponding to the set of processing nodes is determined based at least in part on the obtained historical data. The following are two example techniques by which to determine a predicted measure of time corresponding to a processing node of the business service based on historical data associated with that processing node:

First example technique: the mean value of the historical amounts of time used to complete the processing node of the business service is determined to be used as the predicted measure of time associated with the processing node.

Second example technique: the statistical distribution of the historical amounts of time used to complete the processing node of the business service is determined and the amount of time that occurs most often in the statistical distribution is used as the predicted measure of time associated with the processing node.

In some embodiments, a preset time increment for a processing node may also be determined based on the historical data obtained for that processing node. The preset time increment corresponding to a processing node may be determined using one of the following two example techniques:

First example technique: a preset percentage (e.g., 10%) of the determined predicted measure of time corresponding to a processing node is used as the preset time increment corresponding to that processing node.

Second example technique: the maximum historical amount of time used to complete the processing node is determined and then the difference between the determined predicted measure of time corresponding to the processing node and this maximum historical amount of time used to complete the processing node is determined. Then a preset percentage of this difference node is used as the preset time increment corresponding to that processing node.

In some embodiments, a preset increment count threshold value for a processing node may also be determined based on the historical data obtained for that processing node. The preset increment count threshold value corresponding to a processing node may be determined using the following example technique:

The preset increment count threshold value corresponding to a processing node is determined in such a way that the sum of the product of the preset increment count threshold value and the preset increment time plus the predicted measure of time corresponding to the processing node of the designated business service is just slightly larger than the historical maximum amount of the time used to complete the processing node. That is, for example, when 1 is subtracted from the preset increment count threshold value, the corresponding sum is less than the historical maximum amount of the time used to complete the processing node. Similarly, when 1 is added to the preset increment count threshold value, the corresponding sum is greater than the historical maximum amount of time used to complete the processing node. As such, this example technique of determining the preset increment count threshold value corresponding to the processing node determines a preset increment count threshold value based on the preset time increment and the predicted measure of time determined for the same processing node.

At 606, a query reference message associated with the business service is sent to a client, wherein the query reference message includes at least the set of predicted measures of time corresponding to the set of processing nodes. In some embodiments, in addition to the predicted measures of time corresponding to the set of processing nodes, a sequence associated with the order of the processing nodes in the set is also included in the query reference message. In some embodiments, in addition to the predicted measures of time corresponding to the set of processing nodes, a set of preset time increments corresponding to the set of processing nodes is also included in the query reference message. In some embodiments, in addition to the predicted measures of time corresponding to the set of processing nodes, a set of preset increment count threshold values corresponding to the set of processing nodes is also included in the query reference message.

Figure 7:
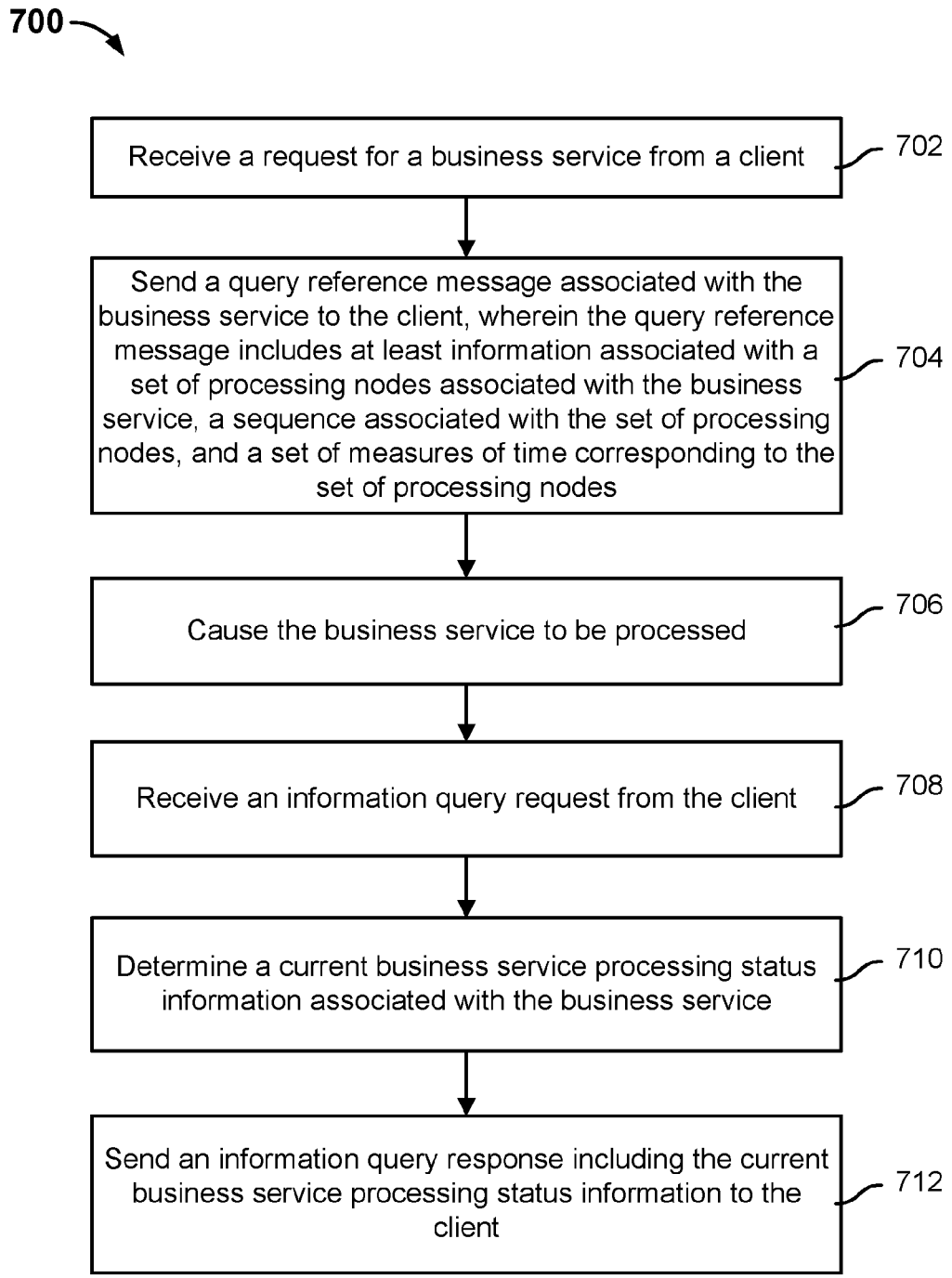
FIG. 7 is a flow diagram showing an embodiment of a process for sending business service processing status information.

FIG. 7 is a flow diagram showing an embodiment of a process for sending business service processing status information. In some embodiments, process 700 is implemented at server 206 of FIG. 2.

At 702, a request for a business service is received from a client. For example, the server may receive from a client a request to process a business service associated with the delivery of a cargo from Location A to Location D.

At 704, a query reference message associated with the business service is sent to the client, wherein the query reference message includes information associated with at least a set of processing nodes associated with the business service, a sequence associated with the set of processing nodes, and a set of predicted measures of time corresponding to the set of processing nodes. The server sends a query reference message to the client and the client is configured to use the contents of the query reference message to determine which processing node of the business service is currently being processed and also to predict whether the processing node of the business service has completed and to therefore send an information query request to receive the current business service processing status information associated with the business service. For example, the server may determine which processing nodes are associated with the requested business service and the sequence of the processing nodes based on stored mappings between business services and corresponding processing nodes (and the sequence thereof) and/or historical data associated with which processing nodes (and the sequence thereof) are commonly associated with which business service. In some embodiments, the query reference message also includes a preset time increment and a preset increment count threshold value corresponding to each processing node. In some embodiments, the server uses a process such as process 600 to determine at least some of the contents of the query reference message.

At 706, the business service is caused to be processed. In some embodiments, the server performs at least a portion of the tasks associated with the business service. For example, a task may include a processing node associated with the business service. In some embodiments, the server determines the tasks associated with the business service and sends at least a portion of the tasks to other entities (e.g., a device associated with a cargo delivery representative) so that the other entities may process the tasks while the server communicates with such entities and tracks the progress/ current status of the processing of the tasks. In some embodiments, 704 may be performed before 706. In some embodiments, 706 may be performed before 704. In some embodiments, 704 and 706 may be performed at least partially in parallel.

At 708, an information query request is received from the client. In some embodiments, the information query request includes a business service identifier associated with the business service for which the current business service processing status information is desired.

At 710, a current business service processing status information associated with the business service is determined. For example, the server may determine the business service processing status information associated with the business service by querying another entity associated with processing the business service. Also, for example, the server may record a new business service processing status information associated with the business service when the business service processing status information of the business service has changed. Then, when the server receives the information query request, the server checks the server's records for the most recent business service processing status information for the business service associated with the business service identifier included in the information query request and returns the information in an information query response that is sent back to the client.

At 712, an information query response including the current business service processing status information is sent to the client.

Figure 8:
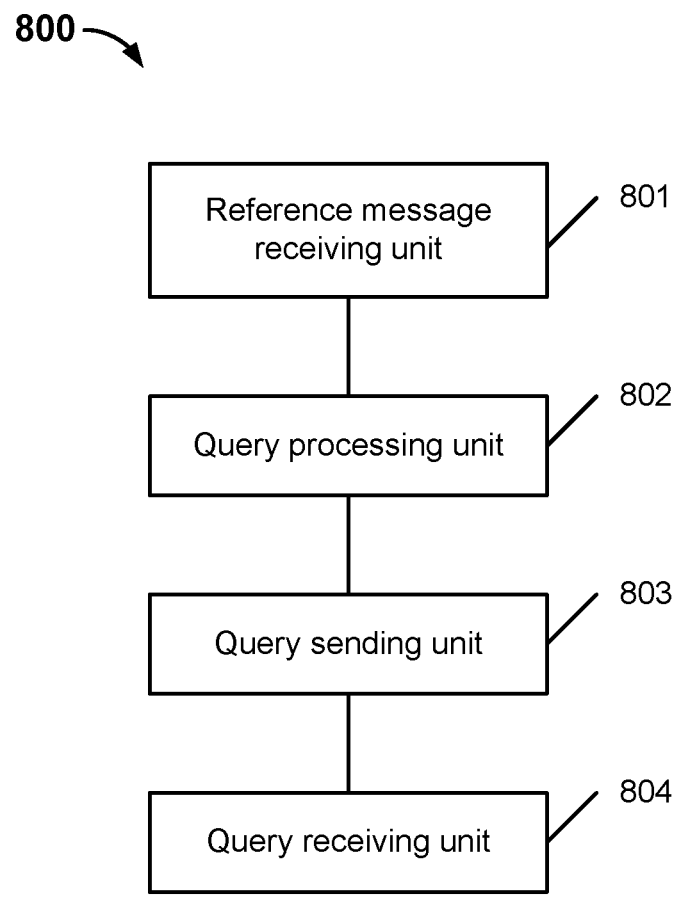
FIG. 8 is a diagram showing an embodiment of a system for querying for business service processing status information.

FIG. 8 is a diagram showing an embodiment of a system for querying for business service processing status information. In some embodiments, client 202 of FIG. 2 is implemented using system 800. In the example, system 800 includes reference message receiving unit 801, query processing unit 802, query sending unit 803, and query receiving unit 804.

The units can be implemented as software components executing on one or more processors, as hardware such as programmable logic devices, and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices.

Reference message receiving unit 801 is configured to receive a query reference message sent by a server. The query reference message includes at least a set of predicted measures of time corresponding to the set of processing nodes associated with a business service previously requested by the client.

Query processing unit 802 is configured to determine a next information query time based on the predicted measure of time corresponding to the current processing node. For example, if the predicted measure of time were an amount of time by which the current processing node needs to complete, then the next information query time is determined to be the time after the predicted measure of time corresponding to the current processing node from either the time of receipt of the query reference message or the current time at the client.

Query sending unit 803 is configured to monitor the current time at the client and to determine when the next information query time occurs. In response to determining that the next information query time has occurred, query sending unit 803 is configured to send an information query request to the server, where the information query request includes the business service identifier for the business service of interest.

Query receiving unit 804 is configured to receive an information query response sent by the server in response to the information query request. The information query response includes the current business service processing status information of the business service.

In some embodiments, query processing unit 802, after query receiving unit 804 receives the information query response sent by the server, is configured to extract the current business service processing status information included in the received information query response. If query processing unit 802 determines that the current business service processing status information is not the same as the business service processing status information stored by the client, query processing unit 802 determines that the business service processing status information has been updated (e.g., since processing on the requested business service had begun or since a previous information query request sent by the client).

In some embodiments, the query reference message received by reference message receiving unit 801 also includes preset time increments corresponding to the set of processing nodes.

In some embodiments, query processing unit 802, after query receiving unit 804 receives the information query response sent by the server, is also configured to extract the current business service processing status information included in the received information query response. If query receiving unit 804 determines that the acquired current business service processing status information is the same as the business service processing status information stored by the client, query processing unit 802 is configured to determine the next information query time to be the time that is the preset time increment corresponding to the processing node from the current time at the client.

In some embodiments, the query reference message received by the reference message receiving unit 801 also includes preset increment count threshold values corresponding to the set of processing nodes.

After the next information query time is determined based on the preset time increment corresponding to the current processing node, if it is determined that the counter value associated with the processing node has not reached the preset increment count threshold value associated with the current processing node, query processing unit 802 is configured to increment the counter value. The counter value corresponding to each current processing node initially starts at zero and is incremented by 1 each time it is incremented.

In some embodiments, if it is determined that the counter value associated with the current processing node has reached the preset increment count threshold value, then query processing unit 802 is configured to determine the next information query time based on the predicted measure of time corresponding to the current processing node.

Figure 9:
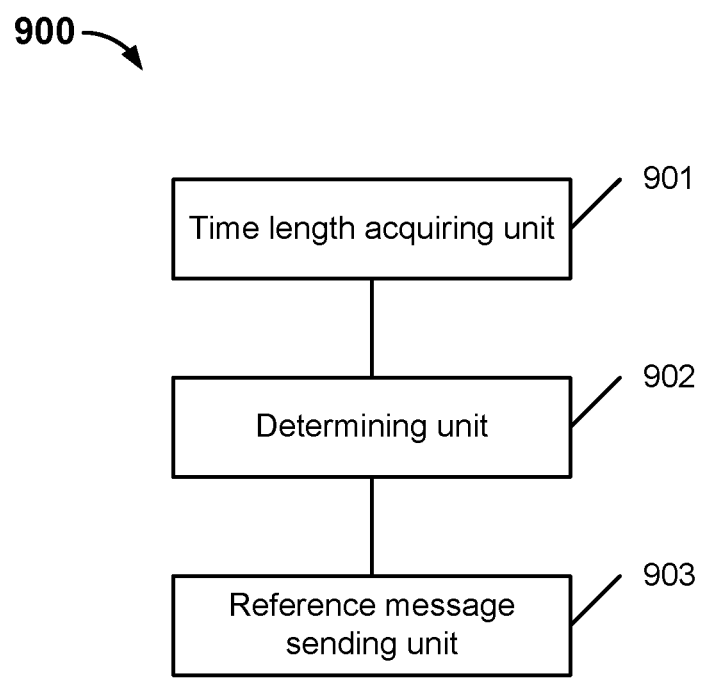
FIG. 9 is a diagram showing an embodiment of a system for sending business service processing status information.

FIG. 9 is a diagram showing an embodiment of a system for sending business service processing status information. In some embodiments, server 206 of FIG. 2 is implemented using system 900. In the example, system 900 includes time length acquiring unit 901, determining unit 902, and reference message sending unit 903.

Time length acquiring unit 901 is configured to obtain historical amounts of time used to complete each processing node of a requested business service.

Determining unit 902 is configured to determine a set of predicted measures of time corresponding to the set of processing nodes associated with the business service based on the historical amounts of time used to complete each processing node of the business service.

Reference message sending unit 903 is configured to send query reference messages to clients, where the query reference messages include at least the set of predicted measures of time corresponding to the set of processing nodes associated with the business service.

In some embodiments, determining unit 902 is configured to determine the preset time increments and/or the preset increment count threshold values corresponding to the set of processing nodes associated with the business service and include such information in the query reference message.

The systems provided by the present application may be realized through computer programs. Persons skilled in the art should be able to understand that the unit partition pattern described above is but one of a great number of unit partition patterns. A system shall fall within the protective scope of the present application so long as it has the functions described above, even if it is partitioned into other units or is not partitioned into units.

The present application is described with reference to flow charts and/or block diagrams based on methods, equipment (systems), and computer program products of the present application. It should be understood that each process and/or block in the flow charts and/or block diagrams, and combinations of processes and/or blocks in the flow charts and/or block diagrams, can be achieved through computer program commands. One can provide these computer program commands to a general-purpose computer, a specialized computer, an embedded processor or the processor of other programmable data processing equipment so as to give rise to a machine, with the result that the commands executed through the computer or processor of other programmable data processing equipment give rise to a device that is used to realize the functions designated by one or more processes in a flow chart and/or one or more blocks in a block diagram.

These computer program commands can also be stored on computer readable storage devices that can guide computers or other programmable data processing equipment to work in a particular way, with the result that the commands stored on these computer readable devices give rise to products that include command devices. These command devices realize the functions designated in one or more processes in a flow chart and/or one or more blocks in a block diagram.

These computer program commands can also be loaded onto a computer or other programmable data processing equipment, with the result that a series of operating steps are executed on a computer or other programmable equipment so as to give rise to computer processing. In this way, the commands executed on a computer or other programmable equipment provide steps for realizing the functions designated by one or more processes in a flow chart and/or one or more blocks in a block diagram.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    sending a request for a current business service, wherein the request includes an identifier associated with the current business service;
    receiving a query reference message from a server, wherein the query reference message includes information associated with a set of processing nodes associated with the current business service, a sequence associated with the set of processing nodes that indicates an order in which the set of processing nodes is to be processed, and a set of predicted measures of time corresponding to the set of processing nodes, wherein the query reference message is dynamically determined based at least in part on using the identifier associated with the current business service to obtain, from a database, historical data associated with previous business services that comprise one or more processing nodes in common with the set of processing nodes associated with the current business service;
    determining a next information query time associated with a current processing node of the set of processing nodes based at least in part on a predicted measure of time of the set of predicted measures of time, the predicted measure of time corresponding to a predicted amount of time to be used to complete processing of the current processing node, wherein the predicted amount of time to be used to complete processing of the current processing node is determined by the server, including by:
        obtaining, from among the historical data associated with the previous business services, a plurality of historical amounts of time used to complete processing of the current processing node; and
        using the plurality of historical amounts of time used to complete processing of the current processing node to generate the predicted amount of time to be used to complete processing of the current processing node;
    in response to an occurrence of the next information query time, sending an information query request to the server;
    receiving an information query response from the server, wherein the information query response includes a current business service processing status information associated with the current business service; and
    determining whether the current business service processing status information indicates that the current processing node has completed.

2. The method of claim 1, wherein the next information query time is determined based at least in part on the predicted amount of time to be used to complete processing of the current processing node and a current time associated with a client.

3. The method of claim 1, wherein the current business service processing status information indicates one or more of the following: which processing node has completed, which processing node is currently still being processed, and whether processing of the current business service has completed.

4. The method of claim 1, further comprising:
    in the event the current business service processing status information indicates that the current processing node has not completed, determining the next information query time based at least in part on the predicted amount of time to be used to complete processing of the current processing node and a time associated with a determination that the current processing node has not completed.

5. The method of claim 1, further comprising:
in the event the current business service processing status information indicates that the current processing node has completed:
  setting the current processing node to be a subsequent processing node in the set of processing nodes based at least in part on the sequence associated with the set of processing nodes; and
  determining the next information query time based at least in part on a predicted measure of time of the set of predicted measures of time corresponding to a predicted amount of time to be used to complete processing of the subsequent processing node.

6. The method of claim 1, wherein the query reference message further includes a set of preset time increments corresponding to the set of processing nodes and a set of preset increment count threshold values corresponding to the set of processing nodes.

7. The method of claim 1, further comprising:
determining that the current business service processing status information indicates that the current processing node has completed; and
in response to the determination that the current processing node has completed, presenting the current business service processing status information.

8. A computer product program, the computer product program being embodied in a non-transitory computer readable storage medium and comprising computer instructions for:
sending a request for a current business service, wherein the request includes an identifier associated with the current business service;
receiving a query reference message from a server, wherein the query reference message includes information associated with a set of processing nodes associated with the current business service, a sequence associated with the set of processing nodes that indicates an order in which the set of processing nodes is to be processed, and a set of predicted measures of time corresponding to the set of processing nodes, wherein the query reference message is dynamically determined based at least in part on using the identifier associated with the current business service to obtain, from a database, historical data associated with previous business services that comprise one or more processing nodes in common with the set of processing nodes associated with the current business service;
determining a next information query time associated with a current processing node of the set of processing nodes based at least in part on a predicted measure of time of the set of predicted measures of time, the predicted measure of time corresponding to a predicted amount of time to be used to complete processing of the current processing node, wherein the predicted amount of time to be used to complete processing of the current processing node is determined by the server, including by:
  obtaining, from among the historical data associated with the previous business services, a plurality of historical amounts of time used to complete processing of the current processing node; and
  using the plurality of historical amounts of time used to complete processing of the current processing node to generate the predicted amount of time to be used to complete processing of the current processing node;
in response to an occurrence of the next information query time, sending an information query request to the server;
receiving an information query response from the server, wherein the information query response includes a current business service processing status information associated with the current business service; and
determining whether the current business service processing status information indicates that the current processing node has completed.

9. The computer product program of claim 8, wherein the next information query time is determined based at least in part on the predicted amount of time to be used to complete processing of the current processing node and a current time associated with a client.

10. The computer product program of claim 8, wherein the current business service processing status information indicates one or more of the following: which processing node has completed, which processing node is currently still being processed, and whether processing of the current business service has completed.

11. The computer product program of claim 8, further comprising:
in the event the current business service processing status information indicates that the current processing node has not completed, determining the next information query time based at least in part on the predicted amount of time to be used to complete processing of the current processing node and a time associated with a determination that the current processing node has not completed.

12. The computer product program of claim 8, further comprising:
in the event the current business service processing status information indicates that the current processing node has completed:
  setting the current processing node to be a subsequent processing node in the set of processing nodes based at least in part on the sequence associated with the set of processing nodes; and
  determining the next information query time based at least in part on a predicted measure of time of the set of predicted measures of time corresponding to a predicted amount of time to be used to complete processing of the subsequent processing node.

13. The computer product program of claim 8, wherein the query reference message further includes a set of preset time increments corresponding to the set of processing nodes and a set of preset increment count threshold values corresponding to the set of processing nodes.

14. The computer product program of claim 8, further comprising:
determining that the current business service processing status information indicates that the current processing node has completed; and
in response to the determination that the current processing node has completed, presenting the current business service processing status information.

15. A system, comprising:
one or more processors configured to:

send a request for a current business service, wherein the request includes an identifier associated with the current business service;

receive a query reference message from a server, wherein the query reference message includes information associated with a set of processing nodes associated with the current business service, a sequence associated with the set of processing nodes that indicates an order in which the set of processing nodes is to be processed, and a set of predicted measures of time corresponding to the set of processing nodes, wherein the query reference message is dynamically determined based at least in part on using the identifier associated with the current business service to obtain, from a database, historical data associated with previous business services that comprise one or more processing nodes in common with the set of processing nodes associated with the current business service;

determine a next information query time associated with a current processing node of the set of processing nodes based at least in part on a predicted measure of time of the set of predicted measures of time, the predicted measure of time corresponding to a predicted amount of time to be used to complete processing of the current processing node, wherein the predicted amount of time to be used to complete processing of the current processing node is determined by the server, including by:

obtaining, from among the historical data associated with the previous business services, a plurality of historical amounts of time used to complete processing of the current processing node; and using the plurality of historical amounts of time used to complete processing of the current processing node to generate the predicted amount of time to be used to complete processing of the current processing node;

in response to an occurrence of the next information query time, send an information query request to the server;

receive an information query response from the server, wherein the information query response includes a current business service processing status information associated with the current business service; and determine whether the current business service processing status information indicates that the current processing node has completed; and one or more memories coupled to the one or more processors and configured to provide the one or more processors with instructions.

\* \* \* \* \*